CURT BELLWINKEL &
FRIEDRICH STUEMPFIG
INVENTORS

United States Patent Office 2,822,793
Patented Feb. 11, 1958

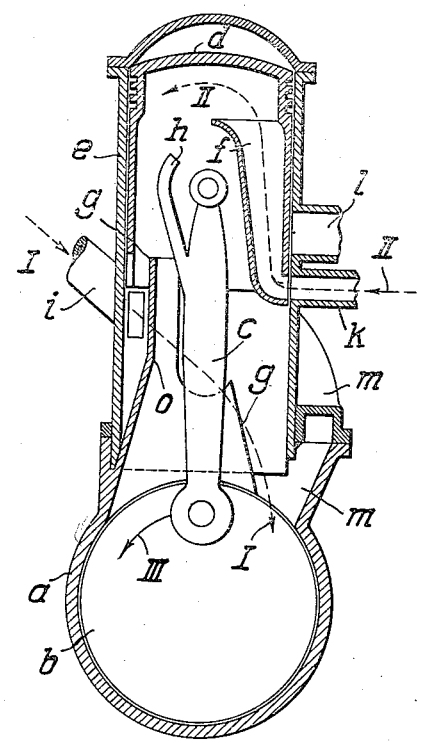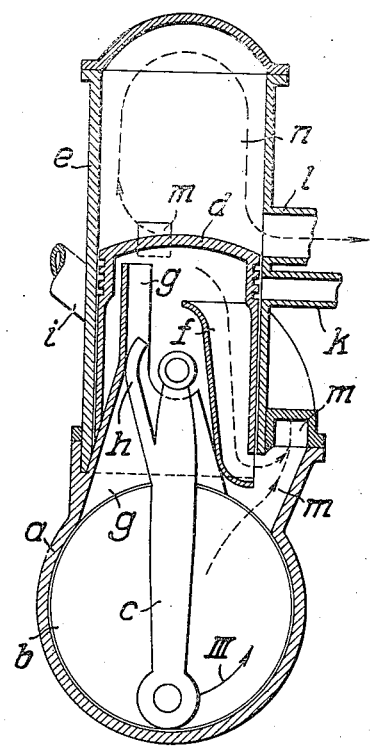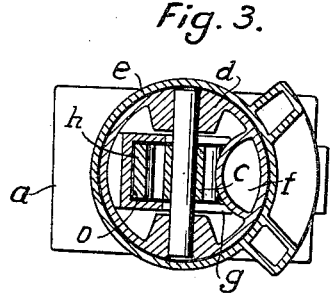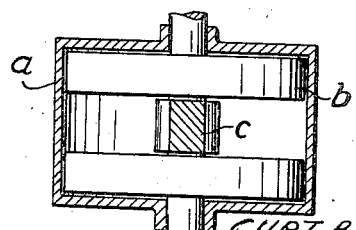

2,822,793
TWO-STROKE INTERNAL COMBUSTION ENGINES

Curt Bellwinkel and Friedrich Stuempfig, Nurnberg, Germany

Application April 24, 1956, Serial No. 580,205

5 Claims. (Cl. 123—73)

This invention relates to two-stroke internal combustion engines of the kind wherein the crank case is adapted for acting as a pump casing also. Engines of this kind, using mixture suction and suitable ignition, or using only air suction and autoignition, are very simple but attain only comparatively low mean working pressures, which can be traced back mainly to poor filling of the cylinders or combustion chambers with a fresh charge. For improving the charging of the combustion chamber, some two-stroke internal combustion engines have been equipped with special charging pumps or superchargers for an additional supply of mixture or air. The disadvantage of this is that the simplicity of two-stroke internal combustion engines is lost. For this reason, two-stroke internal combustion engines have already been proposed wherein the movement of the connecting rod in the crank case was intended to be used for supplying additional mixture, that is to say the delivery of the conventional crank case pump was intended to be increased. The known proposals in this direction are not satisfactory, however, because an increased supply of mixture causes too high a loss of fuel during the scavenging of the combustion chamber and because in these known proposals the supply of additional mixture or air produced by the movement of the connecting rod is only small and the increase in the size of the moving masses of the engine is very large. This also applies in particular to a known arrangement in which a fixed channel or trough in the form of a bulge on the crank case and on the cylinder is so constructed, and the connecting rod is so adapted, that the latter slides in the channel or trough so that it exerts a sealing action on three sides during a large part of a revolution of the crank. The trough-shaped bulge increases the compression space of the crank case in such a manner that only a low compression ratio can be obtained, which again cancels out the advantage of the additional supply.

It is an object of the present invention to provide for improved filling of the combustion chambers with a fresh charge in two-stroke internal combustion engines, while avoiding the disadvantages of the known constructions and the known proposals. Use is likewise made of a fixed channel or trough which encloses the connecting rod on three sides with a sealing action during a large part of a revolution of the crank. As distinct from known constructions and proposals, however, this channel is so arranged that it projects into the cylinder space from the bottom of the cylinder and also into the hollow space of the piston in the innermost position of the piston. By "innermost position of the piston" is meant that position in which the piston is nearest to the crankshaft, that is to say when the piston is at the bottom of its stroke in a vertical engine.

Another object of this invention is the provision of a two-stroke internal combustion engine which introduces into its crank case a quantity of air for combustion and a quantity of enriched fuel-air mixture, the construction of the invention in its preferred form being such as to permit pre-compression of the gaseous quantities without effecting their intermixture in the crank case. The invention takes advantage of this feature by causing the pre-compressed quantities to be discharged into the combustion chamber with substantially non-fuel bearing air preceding the fuel-air mixture so that the earlier arriving air will scavenge the combustion products of the previous engine stroke without loss of fuel.

As compared with the state of the art, the invention provides the great advantage that a substantially increased supply of scavenging medium and thereby an improved scavenging and charging process in the cylinder space are readily obtained. This arrangement in no way results in increased over-all height of the engine. The moving masses are scarcely enlarged in relation to a conventional two-stroke engine. This circumstance, in conjunction with the extremely effective scavenging effect, causes a considerable increase in the power output per litre of piston displacement, which has been confirmed by exhaustive tests. These and other objects, which will appear from time to time throughout the specification, are achieved with very simple means which are reliable in operation.

An embodiment of the invention is shown diagrammatically and by way of example in the accompanying drawing, wherein:

Figure 1 is a vertical section of a vertical engine constructed in accordance with the invention, the piston being shown at the top of its stroke;

Figure 2 is similar to Figure 1 but shows the piston at the bottom of its stroke, Figs. 3 and 4 are sectional views taken respectively along lines x—x and y—y in Fig. 2

Figure 5:
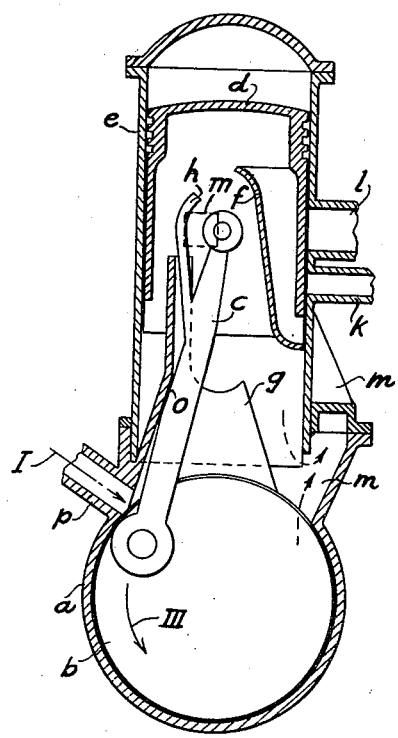
Fig. 5 is a vertical section of an alternate embodiment of the engine in accordance with the invention.

In the drawing, the crankshaft of the engine is rotatably mounted in the crank case $a$ and is fitted with two solid discs or webs $b$ supporting the crank pin to which the rod $c$ is connected. The piston $d$ is moved up and down in the cylinder $e$ by means of the connecting rod $c$. In the piston $d$ there is arranged a duct $f$ fixedly connected to the said piston. On the crank case $a$ there is fixedly mounted or formed an upwardly extending channel $g$ projecting into the cylinder. On the connecting rod $c$ there is formed or fixedly mounted a portion in the form of a curved segment $h$. As will be seen, this portion $h$ is formed or fitted near the upper pivot of the connecting rod $c$ and extends upwards past such upper pivot. The channel $g$ is of U-shaped cross-section. The lower end of the connecting rod $c$ moves in closely fitting manner along the circular part of the crank case $a$ and so that it fits closely on both sides between the two solid webs or discs $b$ of the crankshaft and periodically in closely fitting manner with the channel $g$ as will be explained.

On the upward movement of the piston in the cylinder, a negative pressure is produced in the lower part of the cylinder and in the crank case, which causes air to be drawn in through an air intake $i$ into the cylinder space and into the crank case in the direction of the arrow I, and a rich mixture consisting of little air and a relatively large quantity of fuel to be drawn in through the rich mixture intake $k$ into the hollow space of the piston in the direction of the arrow II, towards the end of the upward movement of the piston, as shown in Figure 1.

During the subsequent downward movement of the piston, due to combustion of a charge previously introduced, air is pre-compressed in the crank case and in the by-pass $m$ and rich mixture is pre-compressed in the hollow space of the piston, until the piston exposes the exhaust duct $l$ and shortly thereafter the top opening of the by-pass $m$. The substantially pure air now first flows out of the by-pass and then the air flows out of the crank case and the rich mixture out of the piston, from duct *f*, and through the by-pass *m* into the combustion chamber *n*, scavenging and displacing the combustion gases therefrom.

The further course of the two-stroke working process in the combustion chamber takes place in the usual manner. The pre-compression of the air in the crank case and in the by-pass and of the rich mixture in the hollow space of the piston and the transfer of the said air and the said rich mixture to the combustion chamber *n* are effected by the downward movement of the piston in the cylinder on the one hand and, on the other hand, by the movement of the connecting rod during the movement of the crank in the direction of the arrow III, for, as soon as the piston has left its upper position shown in Figure 1 by a small amount and the face of the connecting rod has reached the inside of the channel *g* substantially at *o*, the connecting rod *c* sliding along between the crank webs and along the crank case in closely fitting manner also moves in closely fitting manner on a third side in the channel *g* and therefore pushes the air in the crank case in front of it into the by-pass *m* as an additional supply. The rear face of the connecting rod on the left-hand side of the rod *c* in the drawing and the curved portion *h* connected to the said face and the channel *g* are so formed that the curved portion *h* always takes over the sealing or closely fitting action in the channel when the said face of the connecting rod moves away from the inner side of the channel, as shown in Figure 2.

The supply of additional air by the connecting rod, for discharge into duct *m*, renders possible a tolerably complete removal of the combustion gases from the combustion chamber during the scavenging process, and ensures a very good or complete filling of the entire combustion chamber with a fresh charge. The result of this is a very substantial increase in the efficiency of the internal combustion engine.

A particularly advantageous feature of the invention is that the additional air supplied by the connecting rod is very considerable and this supply is obtained in a simple manner without enlarging the moving masses to any extent worth mentioning since the added parts are largely appended to the stationary crank case *a*. In spite of the more powerful scavenging of the combustion chamber, no considerable loss of fuel occurs during the scavenging process because during each scavenging operation the air pre-compressed in the by-pass first passes through the combustion chamber or cylinder space and therefore at best only a part of this air can escape into the exhaust. Moreover, the fuel consumption is also favorable owing to the fact that the rich mixture drawn into the piston space impinges against the hot walls of the piston, the fuel contained in the latter is thereupon vaporized and can therefore then be mixed particularly intimately with the air and be promptly and completely consumed. The vaporization of the fuel moreover renders possible the use of cheap fuels with high temperature vaporization. The introduction of a fuel-air mixture into the hollow space of the piston also provides the advantage of good cooling of the piston. Of course, it is also possible for the internal combustion engine according to the invention to be so designed that a fuel-air mixture ready for combustion is sucked into the crank case and into the hollow space of the piston through a single feed pipe as indicated in Fig. 5.

Thus, for example, the air feed need not take place at the cylinder, but can be carried out at the crank case through a feed pipe *p* shown in Figure 5, whereby the air is drawn in almost uninterruptedly and therefore in a particularly favorable manner. Starting with the connecting rod *c* in the position shown in Fig. 5, it is seen that the charge to the right of the rod and below the piston taken in at *p* and at *k* is compressed by the rod and by the downwardly moving piston and is moved through by-pass duct *m* into combustion chamber *n* in the same manner as in the embodiment of Figs. 1–4, while a new charge is already being drawn into the continuously increasing space to the left of the rod which space is sealed by the sliding contact established by rod *c* and segments *h* with the channel *g*. Due to this seal there is substantially continuous draft at suction stub *p* and a heavy charge is drawn in, and therefore no check valve is required at the stub *p*.

Inasmuch as it is possible to take in a heavy load of pure air through stub *p* the invention is also applicable to two-stroke diesel engines. If the fuel and air are both supplied through conduit *p* it is even possible to operate without the duct *f* and intake *k*.

It is claimed:

1. A two-stroke internal combustion engine of the type having a pump formed in the crank case by engine components for advancing the charge; said engine comprising a cylinder defined by a cylinder head constituting a combustion chamber and having an exhaust duct and a crank case presenting a cylindrical surface portion, a reciprocating piston in said cylinder, a member having walls defining a channel extending into said cylinder, charge intake conduit means connected to said engine below the lower end of said combustion chamber for drawing a charge into the crank case pump, by-pass conduit means extending between said crank case pump and said combustion chamber for guiding a charge out of said crank case pump into said combustion chamber, a crank shaft rotatably disposed in said crank case presenting a pair of disks having peripheral and side surfaces in close proximity to the inner surfaces of said crank case and a connecting rod extending between said piston and said crank shaft and having sides slidable between said walls of said channel and ends slidable adjacent the bottom of said channel and adjacent the cylindrical surface portion of said crank case in sealing proximity thereto, whereby the piston and the connecting rod cooperate to increase the pumping capacity of said pump.

2. Two-stroke internal combustion engine in accordance with claim 1, wherein said connecting rod is provided with a curved portion adapted to engage said channel during the downward stroke of said piston to define a pocket between said piston rod and said channel and portions of the walls of said crank case.

3. Two-stroke internal combustion engine in accordance with claim 1, wherein an aperture is defined in the wall of said piston adjacent the lower end thereof and a duct extends upwardly in said piston from said aperture toward the top of said piston, and said fuel intake conduit means is disposed proximate the lower end of said combustion chamber, said aperture being in alignment with said fuel intake conduit means for the extreme upper position of said piston and being in alignment with said inlet of said by-pass conduit means for the extreme lower position of said piston.

4. A two-stroke internal combustion engine comprising a cylinder enclosed at one end, a hollow reciprocating piston having an end surface defining a combustion chamber in conjunction with said one cylinder end and having a peripheral wall in sliding relation with said cylinder, a crank case disposed at the other end of said cylinder and having crank shaft disks therein, by-pass conduit means extending from an aperture in said crank case on one side of said engine and terminating in an opening in said cylinder in the path of said piston, U-shaped channel means projecting from the crank case contiguous with said disks into the hollow of said cylinder and having a side opening, intake conduit means connected to said engine on the side opposite said aperture, a connecting rod pivotally connected to said piston at one end and also between said disks at its other end, said connecting rod being adapted to oscillate periodically into close fitting relation with said channel through its open side, a curved portion extending laterally of said connecting rod into intermittent sealing relation with the bottom of said channel, whereby movement of said connecting rod and curved portion compresses gases between said disks for discharge into said by-pass conduit in accordance with reciprocations of said piston.

5. The invention according to claim 4 wherein the crank case is provided with an air intake port disposed adjacent the circular path of said other connecting rod end in a manner that said other end moves past the intake port shortly after commencement of the piston's downward stroke.

References Cited in the file of this patent

UNITED STATES PATENTS

| | | |
|---|---|---|
| 1,012,288 | Stephenson | Dec. 19, 1911 |
| 1,217,020 | Laurents | Feb. 20, 1917 |
| 1,229,989 | Low | June 12, 1917 |
| 1,746,768 | Dufour | Feb. 11, 1930 |
| 1,795,551 | Geisse | Mar. 10, 1931 |
| 2,317,772 | Huber et al. | Apr. 27, 1943 |

FOREIGN PATENTS

| | | |
|---|---|---|
| 7,926 | Great Britain | Dec. 11, 1913 |